(12) United States Patent
Narin et al.

(10) Patent No.: US 7,185,363 B1
(45) Date of Patent: Feb. 27, 2007

(54) USING A FIRST DEVICE TO ENGAGE IN A DIGITAL RIGHTS MANAGEMENT TRANSACTION ON BEHALF OF A SECOND DEVICE

(75) Inventors: Attila Narin, Bothell, WA (US); Marco A. DeMello, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 10/265,437

(22) Filed: Oct. 4, 2002

(51) Int. Cl.
*G06F 9/00* (2006.01)
*G06F 12/00* (2006.01)

(52) U.S. Cl. .................. 726/6; 726/7; 726/9; 726/18
(58) Field of Classification Search ............... 726/5–7, 726/18, 9
See application file for complete search history.

(56) References Cited

U.S. PATENT DOCUMENTS

| | | | |
|---|---|---|---|
| 5,191,573 A | 3/1993 | Hair | 369/84 |
| 5,629,980 A | 5/1997 | Stefik et al. | 380/4 |
| 5,734,823 A | 3/1998 | Saigh et al. | 395/200.06 |
| 5,734,981 A | 3/1998 | Saigh | 395/610 |
| 5,892,900 A | 4/1999 | Ginter et al. | 395/186 |
| 5,907,288 A * | 5/1999 | Clark et al. | 340/5.54 |
| 5,940,591 A * | 8/1999 | Boyle et al. | 726/3 |
| 6,134,662 A * | 10/2000 | Levy et al. | 726/11 |
| 6,185,683 B1 | 2/2001 | Ginter et al. | 713/176 |
| 6,212,633 B1 * | 4/2001 | Levy et al. | 713/153 |
| 6,253,193 B1 | 6/2001 | Ginter et al. | 705/57 |
| 6,327,660 B1 * | 12/2001 | Patel | 713/193 |
| 6,891,953 B1 * | 5/2005 | DeMello et al. | 380/277 |
| 6,970,849 B1 * | 11/2005 | DeMello et al. | 705/52 |

* cited by examiner

*Primary Examiner*—Norman M. Wright
(74) *Attorney, Agent, or Firm*—Woodcock Washburn LLP (57) ABSTRACT

A first device is used to initiate and direct a rights-management transaction, such as content licensing, acquisition, or activation, on behalf of a second device. The first device may, for example, be a desktop computer, laptop computer, or electronic kiosk at a bricks-and-mortar store. The second device may, for example, be a handheld computer that is cradled to establish communicative connectivity with the first device. A user interacts with the first device to initiate a transaction on behalf of the second device. The first device then obtains the information from the second device that is necessary to perform the transaction on behalf of the second device, communicates with a server, and provides the result of the server communication to the first device. Thus, the first device acts as a proxy for the second device.

12 Claims, 5 Drawing Sheets

WEB PAGE 700

ACTIVATION CENTER

You may activate up to five devices for your identity

Enter your identity and password:

ID:

Password:

Click here to activate your device

FIG. 7

WEB PAGE 800

CONTENTSTORE.COM

Click and of the following links to download

BOOKS

Manual of Patent Examining Procedure

Principia Mathematica

MUSIC

Beethoven's 5th

Handel's Water Music

VIDEO

Test Pattern

Burning Yule Log

*FIG. 8*

USING A FIRST DEVICE TO ENGAGE IN A DIGITAL RIGHTS MANAGEMENT TRANSACTION ON BEHALF OF A SECOND DEVICE

FIELD OF THE INVENTION

The present invention relates generally to the field of digital rights management and electronic content distribution. More particularly, the invention provides a technique for allowing a first device to engage in a rights-management transaction on behalf of a second device

BACKGROUND OF THE INVENTION

Digital Rights Management (DRM) is a field of computing that addresses the electronic enforcement of legal rights in content. For example, an entity may own intellectual property rights in content such as books, magazines, video, music, software, etc., and may wish to allow this content to be used ("consumed") only on certain terms. DRM provides technological means that allow the entity to distribute content electronically in a manner such that these terms will be enforced.

Typically, DRM systems work by encrypting the content to be protected, and distributing, to every lawful user of the content, an electronic license that contains the decryption key and specifies the terms under which the content can be decrypted for consumption. Implicit in this scheme is a trust relationship between the entity that owns the content and the platform that will enforce the license: since the user's platform will get the decryption key, the platform must be trusted to use the key only in the manner permitted by the license. Typically, this trust is established in an "activation" or "certification" process that prepares the platform for participation in the DRM system, and this process typically results in the platform's being issued a certificate that must be proffered each time the platform attempts to license a content item. In some cases, equivalent certificates may be issued to different platforms that belong to the same user (or group of users), but ultimately each platform must establish a relationship with the DRM system in order to participate in that system.

Since each platform must have a relationship to the DRM system in order to participate in that system, typical DRM systems require that each platform engage in activation, certification, or licensing transactions on its own behalf. Thus, typical DRM systems do not allow a first device to act as a proxy for a second device when: (1) attempting to activate or certify the second device for participation in the DRM system, or (2) acquiring content on behalf of the second device. This facet of DRM systems ignores the fact that it may be more convenient for a user to "tether" one device (e.g., a handheld computer) to another device (e.g., a personal computer), while using the superior user interface of the personal computer to perform a rights-management transaction on behalf of the tethered handheld.

In view of the foregoing, there is a need for a system that overcomes the drawbacks of the prior art.

SUMMARY OF THE INVENTION

The present invention provides a technique for allowing a first device to engage in rights-management transactions on behalf of a second device that is communicatively "tethered" to the first device. For example, a handheld computer could be "tethered" to a desktop computer by placing the handheld computer in a cradle attached to the desktop computer. In this case, a user can employ the desktop computer—with its superior human-interactive components (e.g., full-size keyboard, mouse, etc.), and superior connectivity (e.g., a T1, cable, or DSL connection to the Internet)—to initiate activation, certification, or content acquisition or licensing on the handheld computer. (It should be noted a typical tethered device such as a handheld computer might not have Internet connectivity at all. One advantage of the invention is that it allows the tethered device to engage in a rights-management transaction with a server even if the tethered device has no Internet connectivity of its own.)

When the first device initiates activation on behalf of the second device, the first device obtains from the second device information that is used in the activation process. This information could include one or more hardware identifiers, or a built in platform certificate. The first device then communicates with an activation server to obtain an identity certificate and other components that are specially prepared for the second device, and that will be used in future licensing transactions. The first device then forwards the components to the second device for installation.

When the first device initiates content acquisition or licensing on behalf of the second device, the first device obtains the second device's identity certificate, or information based thereon, from the second device and forward this information to the server that distributes content and/or licenses. The first device then receives content and/or a license that has been specially prepared for use with the second device's identity certificate, and forwards this content and/or license to the second device.

Thus, the invention allows a first device to initiate a rights-management transaction on behalf of a second device, even if the transaction does not result in activation of, or licensure on, the first device.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Exemplary Computing Environment

Figure 1:
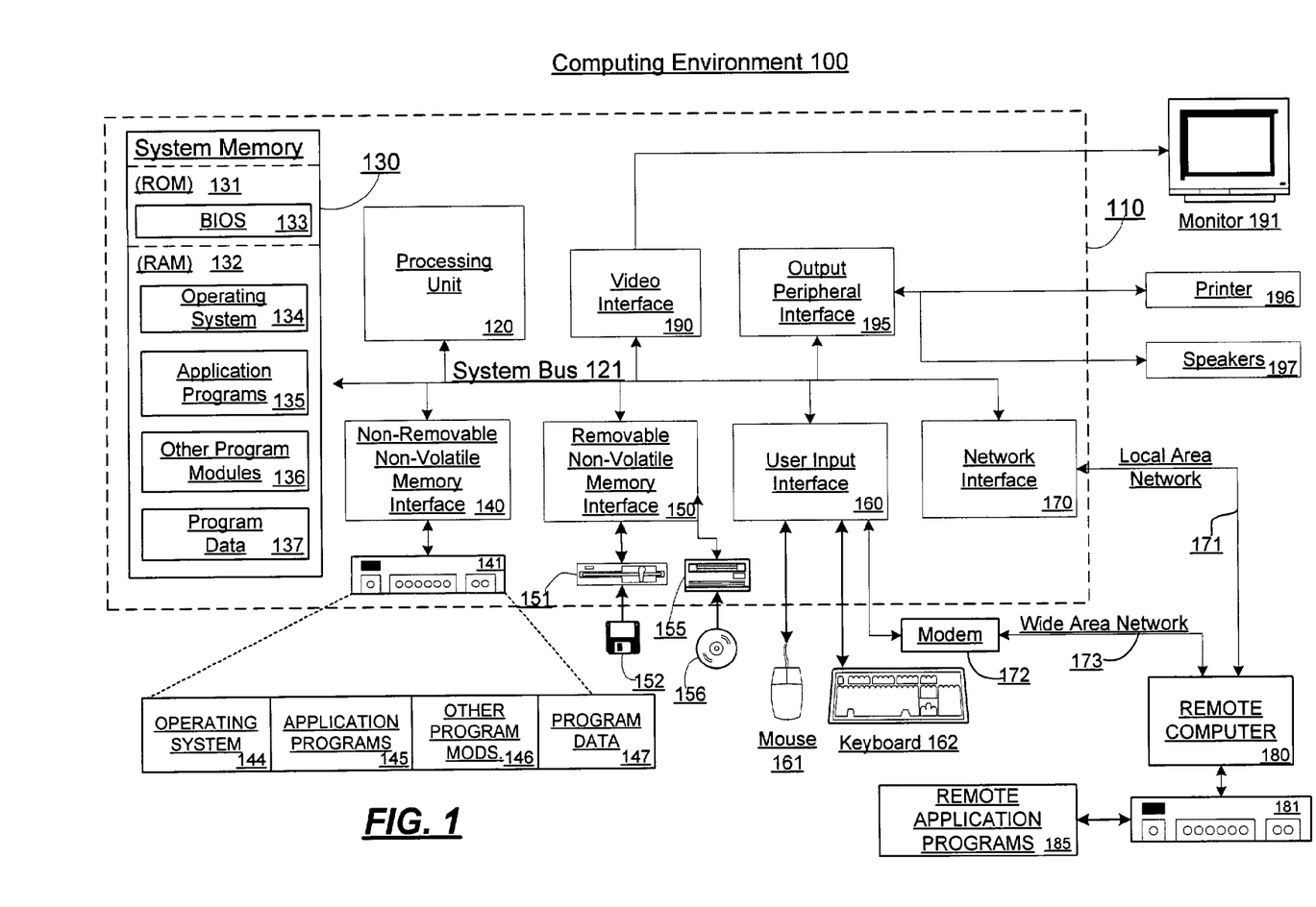
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Device that Supports Use of Rights-Managed Content

Figure 2:
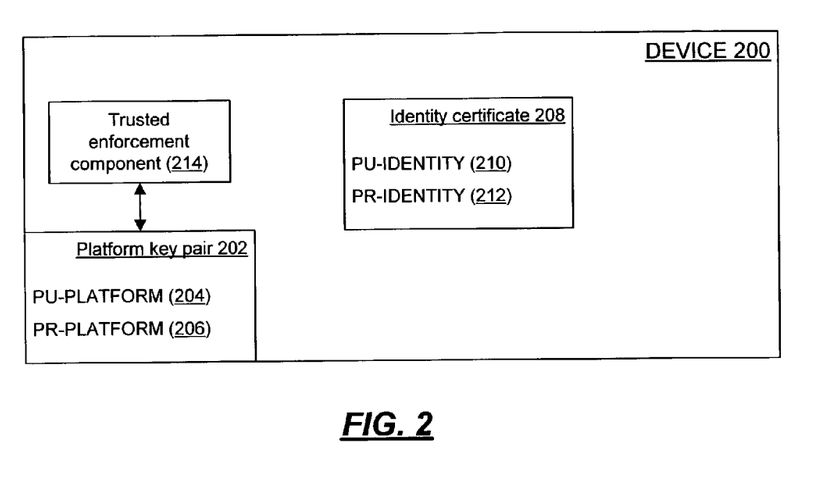
FIG. 2 is a block diagram of an exemplary device configured to support controlled usage of content.

FIG. 2 shows an exemplary device 200 that has been configured to support the controlled usage of rights-managed content. Device 200 may be any type of device that is capable of some type of digital processing—e.g., a desktop computer, a laptop computer, a handheld computer, a portable music device, a portable electronic-book-reading device, etc. Device 200 is associated with a platform key pair 202, which comprises a public key PU-PLATFORM (reference numeral 204), and a private key PR-PLATFORM (reference numeral 206). Device 200 also stores an identity certificate 208, which comprises a public key PU-IDENTITY (reference numeral 210) and a private key PR-IDENTITY (reference numeral 212). PR-IDENTITY is stored in certificate 208 encrypted by PU-PLATFORM. Trusted enforcement component 214 is a software or hardware component associated with device 200, which has access to PR-PLATFORM and can be trusted (a) to protect PR-PLATFORM from divulgence, and (b) to use PR-PLATFORM only under appropriate circumstances.

The basic idea of the scheme shown in FIG. 2 is that content to which access is to be controlled is encrypted in some manner that requires PR-IDENTITY in order to be decrypted. For example, the content can be asymmetrically encrypted with PU-IDENTITY (thereby making the content directly decryptable with PR-IDENTITY), or the content can be symmetrically encrypted with an intermediate key K, where K is only stored on device 200 in a form encrypted by PU-IDENTITY (thereby making the content decryptable with K, which, in turn, is only accessible by using PR-IDENTITY). Moreover, PR-IDENTITY is stored in a manner that requires trusted enforcement component 214 in order to be used. Thus, in the example of FIG. 2, PR-IDENTITY is not stored in the clear, but rather is encrypted by PU-PLATFORM, so that PR-IDENTITY is only accessible using PR-PLATFORM, and PR-PLATFORM is only accessible through trusted enforcement component 214.

The association between key pair 202 and device 200 may be made in various ways. For example:

Key pair 202 may be physically and durably associated with the hardware of device 202 (e.g., key pair 202 may be burned into the circuitry of device 200).

Key pair 202 may be stored in a software component that is uniquely created for, and delivered to, device 200 as part of a registration, activation, or certification transaction. In this case, the software component (which may be enforcement component 214) may be configured to hide the private portion of key pair 202, and may further be configured in some manner such that its correct functioning depends on the presence of some hardware feature that is unique to device 200.

Various techniques are known in the art for associating a key pair with a platform, and the list above is not intended to be exhaustive.

It should be noted that there are various systems that can be used to control usage of content on a device, and FIG. 2 depicts only one such exemplary system. For example, usage of content can be controlled without the need for identity certificate 208, by encrypting content with PU-PLATFORM. However, content that was encrypted with PU-PLATFORM would only be consumable on device 200, since only device 200 has the key PR-PLATFORM that would be necessary to decrypt the content. One advantage of the structure shown in FIG. 2 is that, by encrypting content (or an intermediate key, K, as described above) with PU-IDENTITY, the set of devices on which that piece of content is consumable can be dynamically expanded by installing identity certificate 208 on plural devices (or, more precisely, installing a version of identity certificate 208 where PR-IDENTITY would be encrypted with each device's public platform key).

It should also be noted that typical DRM system use encryption in connection with a licensing scheme. That is, enforcement component 214 typically does not merely decrypt content, but rather enforces the terms of an electronic license that specifies the terms under which content may be decrypted and consumed. Electronic licenses are known the art, and thus are not described at length herein.

Exemplary Environment for Engaging in a Transaction with a Tethered Device

Figure 3:
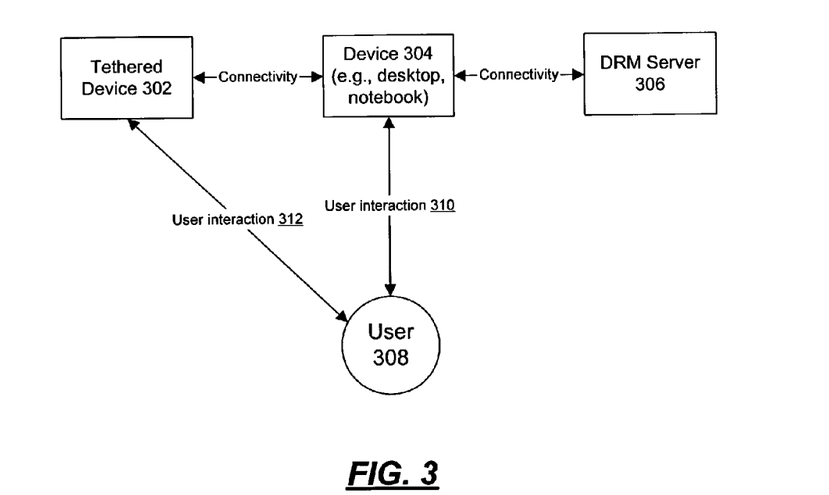
FIG. 3 is a block diagram of an exemplary environment for engaging in a transaction with a tethered device.

FIG. 3 shows an exemplary environment for using a first device to perform a transaction on behalf of a second (tethered) device. Device 302 is electronically "tethered" to device 304—that is, there is some type of communicative connectivity 303 between device 302 and device 304. In a typical example, device 304 is a desktop or notebook PC, and device 302 is a handheld computer, or dedicated music (or video, or electronic book) rendering device. In this example, device 302 has been placed in a "cradle" that is connected to device 304 by a cable, and this "cradling" of device 302 establishes connectivity 303 between device 302 and 304. However, it should be understood that connectivity may be established in any manner (e.g., wireless infrared communications, wireless radio-frequency communications such as Bluetooth, etc.).

User 308 engages in some type of interaction 310 with device 304. For example, interaction 310 may be performed using a keyboard or mouse attached to device 304, and the connectivity (e.g., Internet connectivity) of device 304. User interaction 310 causes device 304 to initiate a transaction with server 306 on behalf of device 302. Server 306, in this example, is either an activation server that "activates" a device (e.g., configures the device for controlled usage of content by delivering identity certificate 208 to a device), or a content server that delivers content to a device. (Connectivity 305 is presumed to exist between device 304 and server 306; this connectivity may take the form of a network, such as WAN 173 or LAN 171 (shown in FIG. 1)). While user interaction 310 takes place between user 308 and device 304, the interaction takes place on behalf of tethered device 302. Thus, the effects of the transaction with server 306 take place on tethered device 302—i.e., tethered device 302 becomes activated, or tethered device 302 acquires content. Optionally, a user interaction 312 may also take place between user 308 and tethered device 302. For example, the visual display of tethered device 302 may show that tethered device 302 is in the process of being activated or acquiring content.

Exemplary Transactions on Behalf of a Tethered Device

Figure 4:
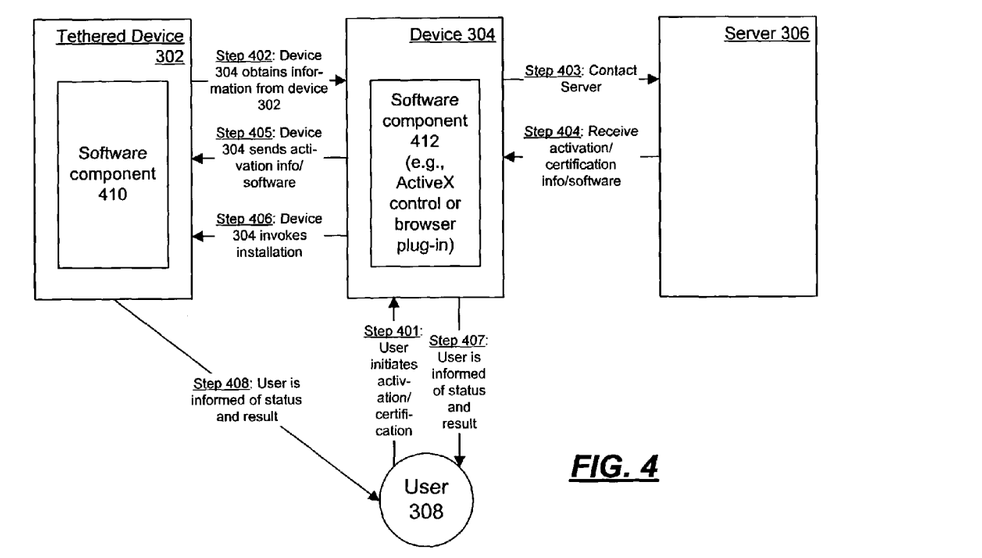
FIG. 4 is a flow diagram of an exemplary process for activation and/or certification of a tethered device.

FIG. 4 shows an exemplary activation/certification that device 304 performs on behalf of (as a "proxy" for) tethered device 302.

At step 401, user 308 initiates an activation or certification process. The user may initiate this process through user interaction 310, as described in FIG. 3. At step 402, device 304 obtains relevant information from device 302 that will be needed in the activation or certification process. (Device 304 may include some type of logic (e.g., software component 412) that determines whether to activate itself or tethered device 302, depending on whether or not device 302 is tethered.) This information, for example, may include identification information (e.g., hardware identifiers, such as processor serial number, device serial number, etc.), version information, a public key certificate associated with device 302's hardware, etc. The nature of the information received at step 402 depends on what type of information the DRM system will install on device 302 as part of the activation process. For example, if the activation process will result in installing a unique software component on device 302 that will only apply PR-PLATFORM in the presence of a particular set of hardware identifiers, then device 304 may need to receive device 302's hardware identifiers so that the resulting software component can be configured appropriately. If device 302 has a built-in hardware enforcement component that comes with a key pair physically etched in the silicon of device 302, then the information provided at step 402 may include this public key certificate, so that the private portion of identity certificate 208 can be encrypted with the device's public key. Step 402 calls for device 304 to receive any information about device 302 that will be needed in the activation process, but the invention is not limited to any such type of information.

At step 403, device 304 provides server 306 with the information that was retrieved at step 402 (e.g., the hardware identifier(s), the built-in certificate, etc.). In the example of FIG. 4, server 306 is functioning as an activation or certification server, so server 306 prepares the relevant information necessary to activate device 302. At step 404, server 306 sends this information to device 304. Device 304, in turn, provides this information to device 302 (step 405).

After the activation information has been received at tethered device 302, device 304 invokes installation of the activation information on tethered device 302 (step 406). For example, step 406 may comprise installing identity certificate 208 in an appropriate place on device 302. Also, in the case where the activation process includes preparing a custom software enforcement component 214 for device 302, then step 406 comprises installing this software on device 302. (The installation may be performed with the assistance of software 410 residing on tethered device 302.)

After installation of the activation information is complete (or if installation is unsuccessful), device 304 notifies user 308 of the status of the activation (step 407). For example, device 304 may display a message such as "tethered device activated" or "activation failed," device 304's display. Optionally, device 302 may notify user 308 of the status of activation, by displaying a similar message (step 408).

Figure 5:
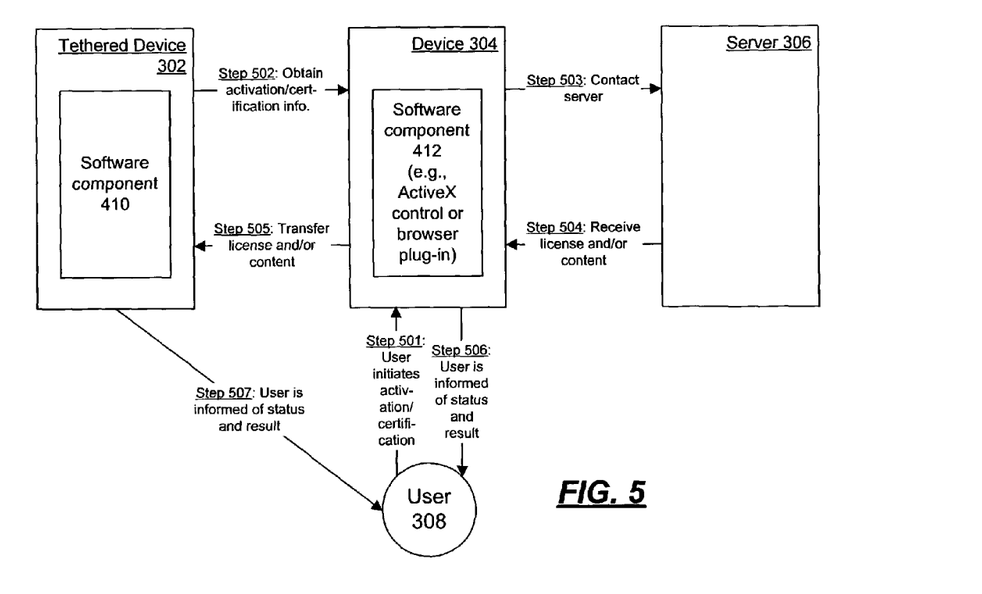
FIG. 5 is a flow diagram of an exemplary process for content acquisition and/or licensing on a tethered device.

FIG. 5 shows an exemplary process for acquiring and/or licensing content on tethered device 302. User 308 engages in an interaction with device 304 to initiate acquisition and/or licensing of protected or rights-managed content (step 501). For example, user 308 may use a keyboard or mouse to indicate some content item that user 308 wishes to acquire. (Alternatively, user 308 may already have the unlicensed content item, but may need a license in order to consume the content; in this case, the acquisition that is initiated at step 501 seeks to acquire a license rather than licensed content.) Device 304 then obtains from device 302 the relevant certificate information from device 302 (step 502). (As in the case of FIG. 4, device 304 may use logic, such as software component 412, to determine whether to acquire content on behalf of itself or on behalf of tethered device 302, depending on whether device 302 is tethered to device 304.) This certificate information was installed on device 302 during an activation process, such as that shown in FIG. 4. In one example, the certificate information that is obtained at step 502 is the public portion 210 of identity certificate 208, since this public portion 212 will be used to encrypt the protected content to be downloaded (or, the public portion will be used to encrypt a decryption key for the protected content). After obtaining the certificate information, device 304 contacts server 306 and provides that server with the certificate information (step 503).

In the example of FIG. 5, server 306 is functioning as a content distribution server, so server 306 prepares the licensed content (or just the license) for the user. For example, server 306 may encrypt the content (or a decryption key for the content) with the public portion 210 of identity certificate 208, and prepare an electronic license that permits the user to consume the content. Device 304 then receives the protected content, or license, or both (step 504). Device 304 then transfers the license and/or content to tethered device 302. (Device 302 may use software 410 to place the license and/or content in an appropriate library or license store on tethered device 302.) Device 304 then informs user 308 of the status and result of the transaction (step 506)—i.e., either that the transaction succeeded or failed. For example, device 304 may provide a message on its display, such as "licensing transaction succeeded" or "licensing transaction failed." Device 302 may also indicate the status and result of transaction in a similar manner (step 507).

Exemplary Content Download Scenario

Figure 6:
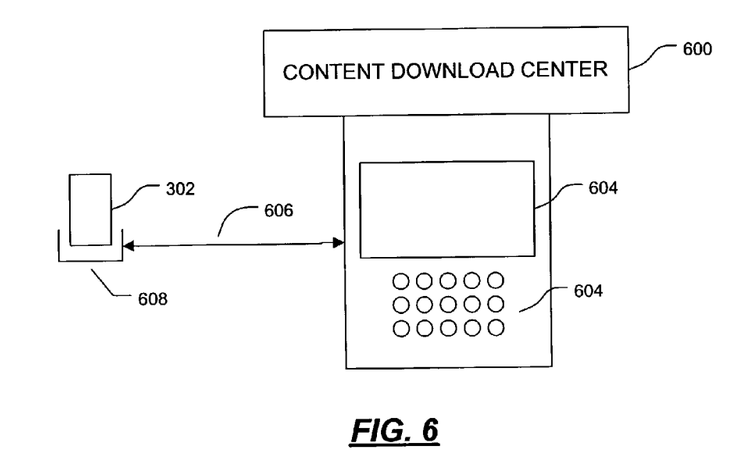
FIG. 6 is a block diagram of an exemplary system in which content may be acquired.

FIG. 6 shows an example of a scenario where it may be useful to use a first device to download content on behalf of a second (tethered) device. FIG. 6 shows a kiosk 600 that may, for example, be located in a bricks-and-mortar store. For example, bookstores, music stores, or video stores may position such kiosks in commercially strategic locations. Kiosk 600 may be or comprise a computing device, such as computer 110 (shown in FIG. 1). Kiosk 600 may include a visual display 602 and keyboard 604, which allow a user to interact with kiosk 600. A communication link 606 connects kiosk 600 to a cradle 608. Thus, a user can establish a data connection between device 302 and kiosk 600 by placing device 302 into cradle 608.

In the example of FIG. 6, kiosk 600 serves the role played by device 304 in FIGS. 3–5. That is, a user interacts with kiosk 600 in order to activate device 302, or acquire content (or licenses) for device 302. The existence of a public device, such as kiosk 600, demonstrates an advantageous feature of the invention: the proxy device (i.e., the kiosk 600, in this example) need not be activated to the same user identity as the tethered device. For many reasons, it may be undesirable to require the proxy device to be activated for the tethered device's user (e.g., the user may be limited to activating five devices, and may not want to waste an activation on a public kiosk, or the user may not want to leave his persona on a public device, etc.). Thus, according to one feature of the invention, the proxy device acts as a mere conduit for transactions that are performed on the tethered device.

Exemplary User Interfaces for Activation and Content Download

Figure 7:
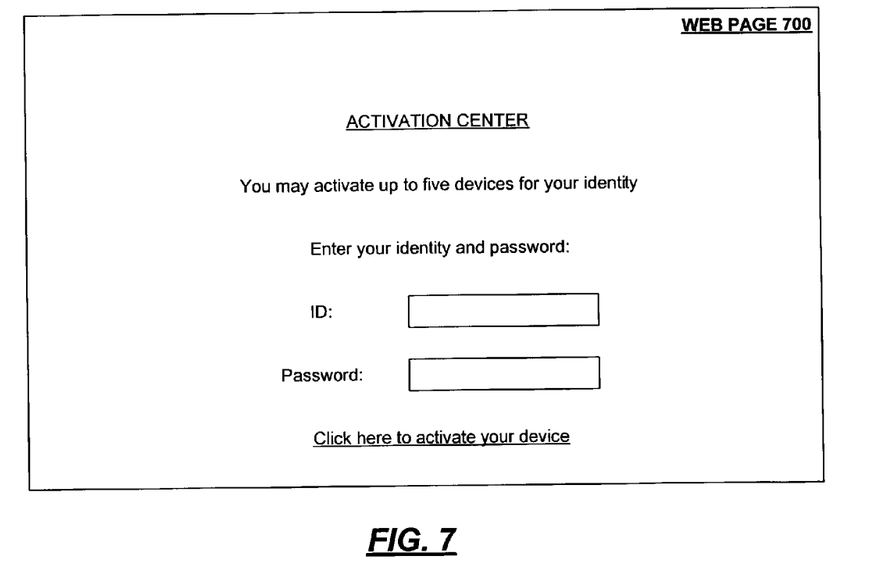
FIG. 7 is a block diagram of an exemplary web page for activating a device in accordance with aspects of the invention.
Figure 8:
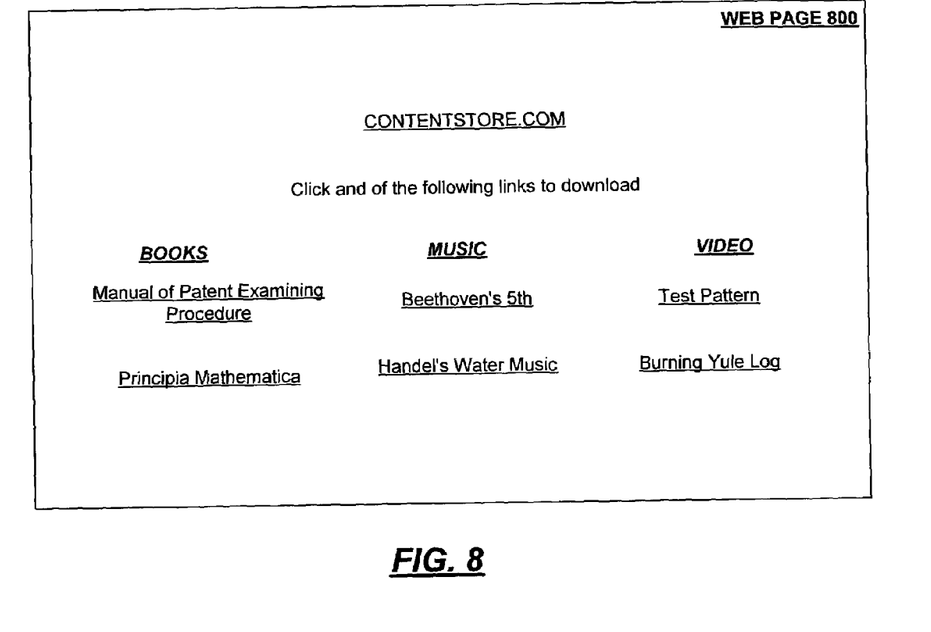
FIG. 8 is a block diagram of an exemplary web page for acquiring content in accordance with aspects of the invention.

FIGS. 7 and 8 show exemplary web pages that may be used to permit user 308 to initiate activation or content acquisition transactions. The web pages depicted in FIGS. 7 and 8 are typically issued by server 306, and they enable user 308 to engage in interaction 310 (shown in FIG. 3).

FIG. 7 shows an exemplary web page 700 that allows a user to initiate a download transaction. A user may access web page 700 by using a conventional web browser on device 304 to visit an activation web site hosted by server 306. Web page 700 may, for example, take the form of an "activation center," which advises the user that he may activate up to five devices for a given identity. In this example, the user's "identity" is defined by the user's ID and is authenticated by the user's entering a password. However, it will be understood that the combination of a user ID and password is merely one example of an identification and authentication scheme. As another example, the user could be issued a smart card that identifies the user with a unique number, and also has the ability to engage in an authentication procedure that does not require the user to enter a password. As a further example, the user's identity could be defined by a scan of the user's fingerprint or iris. There are many ways to define an "identity," and the invention should not be construed as being limited to an identity based on a user-id and password. Additionally, it should be noted that identities need not be associated one-to-one with users; a group of users, or an organization whose membership changes dynamically.

Regardless of the type of identity used, web page 700 offers the user a chance to activate a device to such an identity. In the example of FIG. 7, the user initiates the activation transaction by entering his user ID and password, and clicking the link that says "click here to activate your device." At this point, logic on device 304 (e.g., software component 412, shown in FIG. 4) may determine whether device 302 is actually tethered to device 304, and may decide to activate either device 302 or device 304 depending on whether device 302 is tethered. This decision process can take place "behind-the-scenes," without any user involvement.

FIG. 8 shows an example of a web page 800 that may be used to acquire content. A user may access web page 800 by using a conventional web browser on device 304 to visit a content distribution web site hosted by server 306. Web site 800 offers various types of content for download and licensure: books, music, and video in this example. Each content item has a link associated therewith, and the user can download the content indicated by clicking the link. For example, the user can download and license the "Manual of Patent Examining Procedure" by clicking the link with that name. Logic residing on device 304 (e.g., software component 412) may determine to acquire content either for device 304 or a tethered device 302, depending on whether device 302 is tethered.

It will be understood that while FIG. 8 shows a web page for acquiring new content, a similar web page could be constructed that allows the user to obtain licenses for content that is already present on the tethered device.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method of using a first device to enable the use of access-restricted content on a second device, the second device having associated therewith a first key pair comprising a first public key and a first private key, the method comprising:

establishing a communication connection between the first device and the second device;

engaging in a user interaction with the first device to initiate acquisition of the content;

at the first device, obtaining data that enables the use of the content in the presence of the first private key; and transmitting the data to the second device, wherein the second device is further associated with a second key pair comprising second public key and a second private key, and wherein the first private key is stored on the second device in a form that requires the second private key for decryption, wherein the second private key is built into hardware of the second device.

2. A method of using a first device to enable the use of access-restricted content on a second device, the second device having associated therewith a first key pair comprising a first public key and a first private key, the method comprising:

establishing a communication connection between the first device and the second device;

engaging in a user interaction with the first device to initiate acquisition of the content;

at the first device, obtaining data that enables the use of the content in the presence of the first private key; and transmitting the data to the second device, wherein the second device is further associated with a second key pair comprising second public key and a second private key, and wherein the first private key is stored on the second device in a form that requires the second private key for decryption, wherein the second device is further associated with one or more substantially unique hardware features, and wherein the second devices stores a software module that is adapted to perform decryption using the second private key only in the presence of said substantially unique hardware features.

3. A method of using a first device to enable the use of access-restricted content on a second device, the second device having associated therewith a first key pair comprising a first public key and a first private key, the method comprising:

establishing a communication connection between the first device and the second device;

engaging in a user interaction with the first device to initiate acquisition of the content;

at the first device, obtaining data that enables the use of the content in the presence of the first private key;

transmitting the data to the second device; and on an output component of the first device, notifying the user of completion of a transaction.

4. The method of claim 3, further comprising:

on an output component of the second device, notifying the user of completion of said transaction.

5. A method of using a first device to enable the use of access-restricted content on a second device, the second device having associated therewith a first key pair comprising a first public key and a first private key, the method comprising:

establishing a communication connection between the first device and the second device;

engaging in a user interaction with the first device to initiate acquisition of the content;

at the first device, obtaining data that enables the use of the content in the presence of the first private key; and transmitting the data to the second device, wherein said obtaining act comprises obtaining said data from a server device that is distinct from the first and second devices, and wherein the first device and the server device are on a network that provides communicative connectivity between the first device and the server device, wherein the second device is not on said network, and wherein the method further comprises:

using said communicative connectivity to obtain at least said data from said server device on behalf of said second device.

6. A method of using a first device to prepare a second device for consumption of access-restricted content on a second device, the second device having substantially unique information associated therewith, the method comprising:

establishing a communication connection between the first device and the second device;

engaging in a user interaction with the first device to initiate preparation of the second device for consumption of access-restricted content;

at the first device, obtaining first data that relates to the use of access-restricted content, the first data being based at least in part on the substantially unique information; and transmitting the first data to the second device, wherein the substantially unique information comprises one or more hardware features of the second device, and wherein the method further comprises:

at the first device, receiving second data indicative of the one or more hardware features from the second device, wherein the first data that relates to the use of access-restricted comprises:

a software module that is associated with a first key pair comprising a first public key and a first private key, the software module being adapted to apply the first private key only in the presence of said one or more hardware features; and a second key pair comprising a second public key and a second private key, wherein the second private key is in a form that requires the first private key for decryption.

7. A method of using a first device to prepare a second device for consumption of access-restricted content on a second device, the second device having substantially unique information associated therewith, the method comprising:

establishing a communication connection between the first device and the second device;

engaging in a user interaction with the first device to initiate preparation of the second device for consumption of access-restricted content;

at the first device, obtaining first data that relates to the use of access-restricted content, the first data being based at least in part on the substantially unique information;

transmitting the first data to the second device; and on an output component of the first device, notifying the user of completion of a transaction.

8. A method of using a first device to prepare a second device for consumption of access-restricted content on a second device, the second device having substantially unique information associated therewith, the method comprising:

establishing a communication connection between the first device and the second device;

engaging in a user interaction with the first device to initiate preparation of the second device for consumption of access-restricted content;

at the first device, obtaining first data that relates to the use of access-restricted content, the first data being based at least in part on the substantially unique information;

transmitting the first data to the second device; and on an output component of the second device, notifying the user of completion of said transaction.

9. A method of using a first device to prepare a second device for consumption of access-restricted content on a second device, the second device having substantially unique information associated therewith, the method comprising:

establishing a communication connection between the first device and the second device;

engaging in a user interaction with the first device to initiate preparation of the second device for consumption of access-restricted content;

at the first device, obtaining first data that relates to the use of access-restricted content, the first data being based at least in part on the substantially unique information; and transmitting the first data to the second device, wherein said act of obtaining first data that relates to the use of access-restricted content comprises obtaining said first data from a server device distinct from said first device and said second device, and wherein the first device and the server device are on a network that provides communicative connectivity between the first device and the server device, wherein the second device is not on said network, and wherein the method further comprises:

using said communicative connectivity to obtain at least said first data from said server device on behalf of said second device.

10. A computer-readable medium encoded with computer-executable instructions to perform a method of using a first device to engage in a rights management transaction on behalf of a second device that is communicatively connected to the first device, the method comprising:

using the first device to engage in a user interaction to initiate a transaction on behalf of the second device;

obtaining first information at the first device from the second device, the first information being associated with the second device;

requesting that a third device perform an operation in furtherance of the transaction, the third device being remote from the first and second devices, the request being based on the first information, whereby the operation generates second information;

receiving the second information from the third device; and providing the second information to the second device, wherein the rights management transaction comprises preparing the second device to use rights-managed content, and wherein the second information comprises a first certificate that permits rights-managed content to be consumed on the second device.

11. The computer-readable medium of claim 10, wherein the first information comprises one or more hardware features or identifiers of the second device, and wherein the obtaining act comprises obtaining the identifiers or information indicative of the hardware features.

12. The computer-readable medium of claim 10, wherein the first information comprises a second certificate that is physically associated with the second device, and wherein the obtaining act comprises obtaining at least a portion of the certificate.

* * * * *